UNITED STATES PATENT OFFICE.

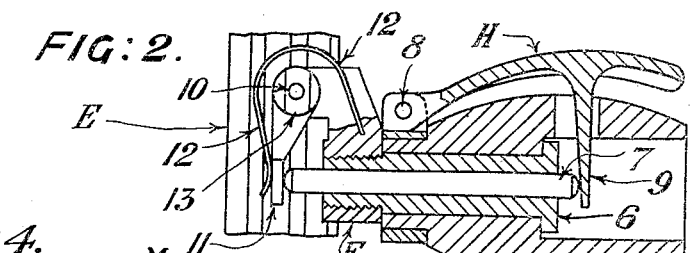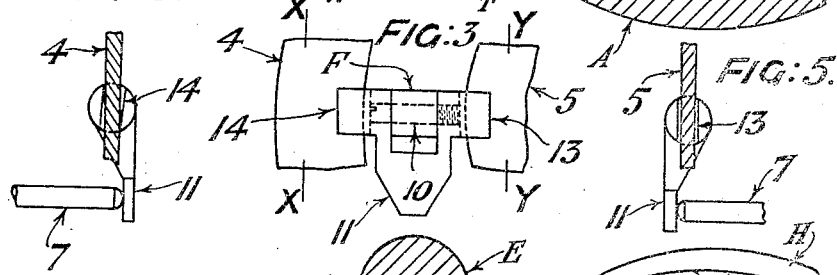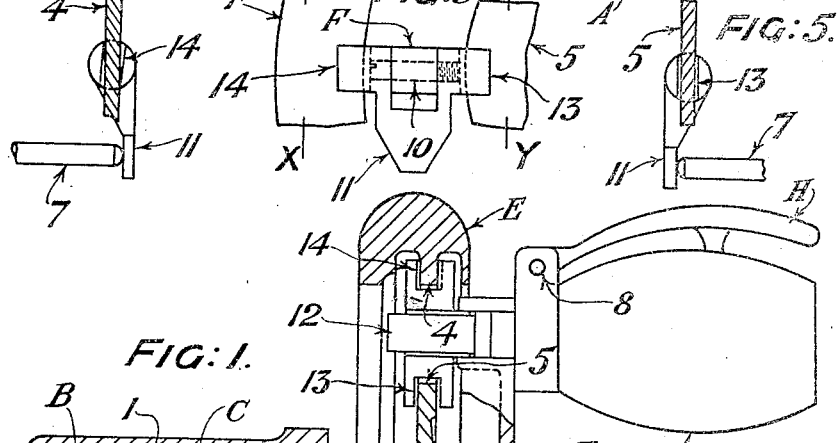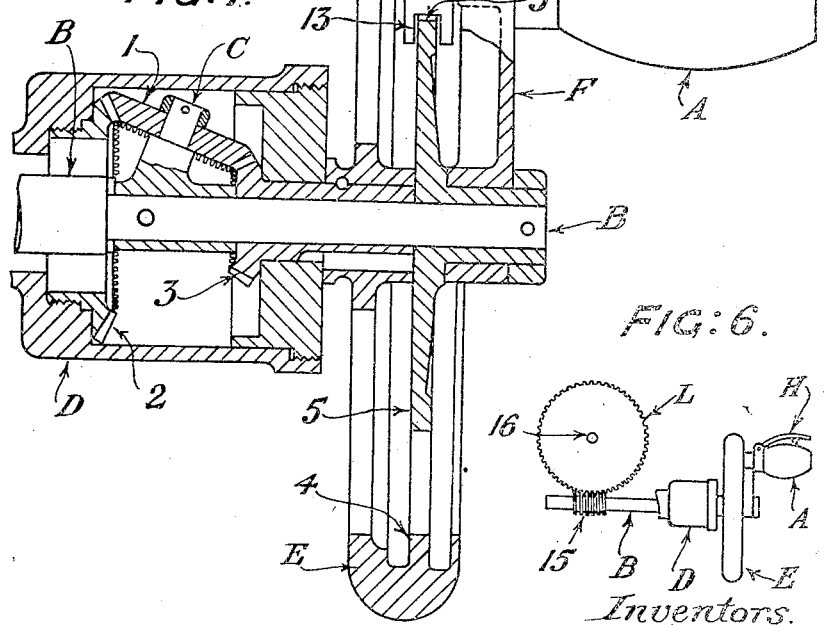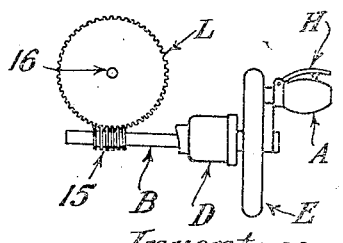

ARCHIBALD BARR AND WILLIAM STROUD, OF ANNIESLAND, GLASGOW, SCOTLAND, ASSIGNORS TO BARR AND STROUD, LIMITED, OF ANNIESLAND, GLASGOW, SCOTLAND.

VARIABLE-SPEED HAND-DRIVING MECHANISM.

1,348,690.  Specification of Letters Patent.  Patented Aug. 3, 1920.

Application filed September 30, 1919. Serial No. 327,490.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented a new and useful Variable-Speed Hand-Driving Mechanism, of which the following is a specification.

This invention relates to hand driven variable speed driving mechanism of the type in which the drive is applied by a driving handle revolved by hand and changes from one speed of drive to another are effected by the hand which turns the handle while the drive is being applied.

The object of this invention is to produce improved variable speed hand driving mechanism of this type in which while the drive is being applied a change from one speed of drive to another can be made rapidly and smoothly without interrupting the operation of the handle, without appreciable shock to the driving mechanism or to the hand, and without necessitating any alteration in the position of the wrist of the hand gripping the handle during the process of actuating the controlling means with which the handle is provided.

Hand driven variable speed driving mechanism according to this invention consists of a driving handle to be revolved by hand, a driven part, change speed gearing in driving connection with the driven part, the change speed gearing having driving members, one for each different speed, friction clutch mechanism carried by the driving handle for disconnecting the driving members from or frictionally connecting them separately with the driving handle, and controlling means provided on the driving handle movable laterally relative to the axis of the handle for actuating the friction clutch mechanism.

Hand driven variable speed mechanisms according to this invention are particularly applicable for use in conjunction with instruments which require to be turned at variable speeds about an axis, for example, in the process of training and elevating optical instruments, such as, observing telescopes, range finders and height finders.

An example of variable speed driving mechanism according to this invention will now be described with reference to the accompanying drawing, in which:—

Figure 1 is a longitudinal sectional elevation and Fig. 2 is a sectional plan with the parts which the hand grips shown in the same position as in Fig. 1.

Fig. 3 is an end elevation showing portions of driving members and friction clutch mechanism, and Figs. 4 and 5 are sectional plans of these parts, Fig. 4 being a section on the line X X of Fig. 3 looking toward the right and Fig. 5 a section on the line Y Y looking toward the left.

Fig. 6 is an elevation indicating an application of the driving mechanism.

In the construction illustrated, A designates a driving handle, B a shaft constituting the driven part, about the axis of which the handle A is adapted to be revolved by hand.

Fixed to revolve with the shaft B is a pivot C on which is mounted a jockey wheel 1 of a differential gear 1, 2, 3. Gear wheel 2 is held stationary by being fixed to a casing D, and gear wheel 3 is connected with a flywheel E with which it rotates. The flywheel E is formed with a driving member 4, and fixed to rotate with the shaft B is a driving member 5. The interior rim of the member 4 and the peripheral rim of the member 5 are concentric with the axis of the shaft B.

The driving handle A is mounted incapable of endwise movement but free to rotate upon a sleeve 6 which is fixed to the outer end of a crank F, the crank being mounted to revolve freely about the axis of the shaft B. Extending axially through the sleeve 6 is a rod 7 capable of sliding endwise therein. H is a lever pivoted at 8 to the driving handle A capable of lateral movement relative to the axis of the handle A, the lever H having a finger 9 which is arranged to bear upon the outer end of the rod 7. At the outer end of the crank F a clutch device is provided mounted on a pivot 10, the axis of the pivot 10 being radial to the shaft B. This clutch device comprises a lever 11, arranged to bear upon the inner end of the rod 7, being forced into contact therewith by a spring 12 which is fixed to the outer end of the crank F, and tends to turn the lever 11 about its pivot 10. The clutch device also comprises axially projecting ends each transversely slotted from its outer end forming jaws 13, 14, symmetrical with the axis of the pivot 10, the jaw 13 being arranged to receive the rim of the member 5 and the jaw 14 the rim of the member 4. The jaws are of greater width than the thickness of the members 4, 5, but the sides of the one jaw are at an angle to the sides of the other, so that, in the position indicated, the sides of the jaw 13 stand parallel with the sides of the member 5, while the sides of the jaw 14 are inclined to the sides of the member 4. Thus, if force is applied to the lever 11, in one direction jaw 14 will grip the member 4 while jaw 13 will stand with its sides clear of the member 5, as shown in the drawing, and if force is applied to the lever 11 in the opposite direction jaw 13 will grip the member 5, while jaw 14 will stand with its sides clear of the member 4.

In operation the hand gripping the driving handle A embraces the lever H which may be released so as to be forced laterally outward by the spring operating through the lever 11, rod 7 and finger 9, or by pressure applied from the palm or fingers of the hand the lever H may be depressed laterally relative to the axis of the driving handle A. In the released position of the lever H, the spring 12 acting on the lever 11 turns the jaws about the axis of 10 so that the jaw 14 frictionally grips the member 4 and the drive is transmitted thereto, and by depressing the lever H the finger 9 by pressing the rod 7 against the lever 11 overcomes the force of the spring 12 and turns the jaws about the axis of 10 so that the jaw 13 frictionally grips the member 5 and the drive is imparted thereto.

In operation with the drive applied to the member 5 the shaft B will be driven, when no slip of the friction clutch device occurs, at the same speed as the driving handle A is revolved by direct transmission through the member 5, and when applied to the member 4 at one third of the speed, by transmission through the flywheel E the gear wheel 3 in gear with the jockey wheel 1, the fixed gear 2 with which the jockey wheel 1 gears and the pivot C fixed to the shaft B.

It will be noted that the jaws 13, 14, do not tend to force the members 5, 4, outward or sidewise in the process of operation.

Fig. 6 illustrates an arrangement in which the shaft B is provided with a worm 15 for operating a worm wheel L mounted to turn about the axis of a shaft 16.

We claim:

1. Hand driven variable speed mechanism consisting of a driving handle to be revolved by hand, a driven part, change speed gearing in driving connection with the driven part, the change speed gearing having driving members, one for each different speed, friction clutch mechanism carried by the driving handle for disconnecting the driving members from or frictionally connecting them separately with the driving handle, and controlling means provided on the driving handle movable laterally relative to the axis of the handle for actuating the friction clutch mechanism, for the purposes set forth.

2. Hand driven variable speed mechanism consisting of a driven shaft, a driving handle to be revolved by hand about the axis of the driven shaft, change speed gearing in driving connection with the driven shaft, the change speed gearing having driving members, one for each different speed, each driving member having a rim concentric to the driven shaft, friction clutch mechanism carried by the driving handle having jaws to receive the rims of the driving members, and controlling means provided on the handle movable laterally relative to the axis of the handle for actuating the friction clutch mechanism, for the purposes set forth.

3. Hand driven variable speed mechanism consisting of a driven shaft, a driving handle to be revolved by hand about the axis of the shaft, change speed gearing in driving connection with the driven shaft, the change speed gearing having driving members, one for each different speed, friction clutch mechanism carried by the driving handle for disconnecting the driving elements from or frictionally connecting them separately with the driving handle, and a lever pivoted on the handle movable laterally relative to the axis of the handle for actuating the friction clutch mechanism, for the purposes set forth.

4. Hand driven variable speed mechanism consisting of a driving handle to be revolved by hand, a driven part, change speed gearing in driving connection with the driven part, the change speed gearing having driving members, one for each different speed, a flywheel from which one of the driven members extends, friction clutch mechanism carried by the driving handle for disconnecting the driving members from or frictionally connecting them separately with the driving handle, and controlling means provided on the driving handle movable laterally relative to the axis of the handle for actuating the friction clutch mechanism, for the purposes set forth.

ARCHIBALD BARR.
WILLIAM STROUD.